United States Patent Office 3,020,159
Patented Feb. 6, 1962

3,020,159
METHOD OF ENHANCING THE XANTHOPHYLL CONTENT OF POULTRY FEEDS
Norman F. Kruse, Decatur, Ind., assignor to Central Soya Company, Inc., Decatur, Ind., a corporation of Indiana
No Drawing. Filed Oct. 5, 1959, Ser. No. 844,153
4 Claims. (Cl. 99—4)

This invention relates to a method of enhancing the xanthophyll content of poultry feeds. It also relates to a xanthophyll concentrate for use in preparing poultry feeds.

In the feeding of poultry, particularly chickens, it is important that the feed ration contain a sufficient amount of xanthophyll. It is the xanthophyll which produces the desirable yellow skin pigmentation, and which is responsible for the yellow color of egg yolks. The yellow skin pigmentation is important in the raising of broilers. In the feeding of layers for egg production, the ration should also contain an adequate amount of xanthophyll.

Yellow corn is a good source of xanthophyll, but it is frequently not economically feasible or nutritionally desirable to supply all of the xanthophyll required by poultry by feeding yellow corn as a major component of the ration. Other feed materials which are commonly used in poultry rations contain varying amounts of xanthophyll, but are generally deficient in xanthophyll content with respect to supplying the minimum amount required for good skin pigmentation and egg yolk coloration. Dehydrated alfalfa is relatively rich in xanthophyll, but for some reason the xanthophyll therein is not efficiently utilized by the poultry.

It is therefore a general object of this invention to provide a method of enhancing the xanthophyll content of poultry feeds. A further object is to provide a means for accomplishing such enhancement whereby the xanthophyll is supplied from a concentrated source which permits the xanthophyll content of the feed to be controlled even though the ingredients of the ration are varied and such ration ingredients provide varying amounts of xanthophyll. Further objects and advantages will appear as the specification proceeds.

In the raising of poultry, particularly chickens for the broiler market, it is desirable to have the ration contain from 10,000 to 12,000 units of xanthophyll per pound of feed (1 xanthophyll unit equals 1 microgram). Poultry rations which contain less than 10,000 xanthophyll units per pound of feed material may be considered as deficient, and this deficiency becomes particularly marked when the ration contains less than 8,000 units per pound. To achieve maximum benefit, rations containing from 10,000 to 12,000 xanthophyll units per pound or more should be fed for three to four weeks or longer. An assurance of maximum benefit is given by incorporating from 14,000 to 18,000 units of xanthophyll in each pound of feed material. It will be understood that the natural feed ingredients, such as corn, corn gluten meal, milo, wheat, and so forth, will supply part of the xanthophyll requirement, and that the rest will be supplied by the method of this invention.

In practicing the method of this invention, a xanthophyll concentrate is obtained from orange oil. The orange oil itself is a by-product of the citrus industry, being usually produced by cold pressing the outer colored rinds of the oranges. This outer peel or epicarp contains oil glands which when ruptured exude the orange oil. The orange oil is about ninety percent terpenes and contains carotenoids, including carotene and xanthophyll pigments. Only the xanthophyll, however, is of interest for the purpose of the present invention. Xanthophyll is apparently the only carotenoid which will produce the yellow skin pigmentation effect and egg yolk coloration effect with poultry.

Orange oil may contain from 50 to 150 micrograms of xanthophyll per gram of oil. Such a concentration, however, is too low for the purpose of the present invention. Certain natural feed materials, such as corn gluten meal, contain substantially as much xanthophyll as orange oil. It is therefore important that the orange oil first be processed to prepare a xanthophyll concentrate which can then be mixed with the poultry feed ingredients in accordance with the present invention.

One suitable procedure for preparing such a xanthophyll concentrate is to extract the orange oil with methanol under substantially anhydrous conditions. The xanthophyll will pass from the orange oil into the methanol, and can then be recovered in concentrated form by evaporating the methanol from the extract. By this procedure, the xanthophyll concentration can be increased from around 100 units per gram to 2,500 to 3,000 units per gram. Higher concentrations can be obtained by a multiple stage extraction. The xanthophyll concentrates should contain at least 500 units and preferably contain at least 2,000 units per gram. Speaking more generally, xanthophyll concentrates obtained from orange oil and containing from 500 to 10,000 xanthophyll units per gram are useful in practicing the method of the present invention.

Another suitable procedure for preparing a xanthophyll concentrate is by vacuum distillation of the orange oil. In this procedure, the more volatile components are distilled over leaving a concentrated residue containing the xanthophyll. By carrying out the distillation under vacuum the destruction of the xanthophyll can be largely avoided. By this procedure, concentrates containing from 4,000 to 5,000 xanthophyll units per gram can readily be obtained.

As indicated previously, after the xanthophyll concentrate has been prepared from the orange oil, it is then mixed with other poultry feed ingredients to provide a complete ration. Preferably, this invention is used in conjunction with feed rations which are deficient in xanthophyll, the ingredients thereof, other than the orange oil concentrate supplying less than 8,000 xanthophyll units per pound of feed. An amount of the orange oil concentrate is preferably added which will supply at least 2,000 units of xanthophyll per pound of the feed ration. The complete ration including the orange oil concentrate will provide in excess of 10,000 xanthophyll units per pound of ration, and preferably in excess of 12,000 units per pound of ration.

The method of this invention is further illustrated by the following specific examples.

*Example I*

Orange oil containing approximately 128 micrograms of xanthophyll per gram of oil was subjected to a single stage extraction with methanol at room temperature (70° F.) and under substantially anhydrous conditions. Two parts by weight of methanol were used per part of oil. The methanol phase containing the extracted xanthophyll was separated from the oil phase. After recovery of the extracted xanthophyll by evaporating the methanol, the xanthophyll concentrate was found to contain approximately 2,860 micrograms of xanthophyll per gram of concentrate.

The xanthophyll concentrate was then ready for use in preparing poultry feeds as will subsequently be described in greater detail.

*Example II*

An orange oil containing approximately 128 micrograms of xanthophyll per gram of oil was subjected to vacuum distillation. Temperatures of 140° F. to 175° F. and vacuum of 120 to 500 microns were used in the distillation. The residue containing the xanthophyll, which represented approximately 3.5% by weight of the starting material, contained approximately 3,980 micrograms of xanthophyll per gram of concentrate.

The concentrate was then ready for use as an ingredient in poultry feed rations.

*Example III*

A typical broiler feed would have the following xanthophyll supplying ingredients:

| | Units/lb. of finished feed |
|---|---|
| 70% corn (10,000 units/lb.) | 7,000 |
| 5% corn gluten meal (70,000 units/lb.) | 3,500 |
| 1% dehydrated alfalfa (150,000 units/lb.) | 1,500 |
| | 12,000 |

Replacement of 5% corn gluten meal and 1% alfalfa is made by using 0.4% of the concentrate of Example I (2,860 units/grams or approximately 1,300,000 units/lb.). By using 1% of this concentrate in the finished feed, all the necessary xanthophyll can be supplied from this single ingredient. The significance of supplying xanthophyll from a single source would be the feasibility of enabling the manufacturer to formulate feeds with milo by replacing part or all of the corn in the ration. Milo is understood to be the equivalent of corn in feeding value with the exception that it contains practically no xanthophyll.

*Example IV*

The same as Example III except a xanthophyll concentrate described in Example II was used.

While in the foregoing specification this invention has been described in relation to certain preferred embodiments thereof, it will be apparent to those skilled in the art that many of the details set forth herein can be varied considerably without departing from the basic principles of this invention.

I claim:
1. The method of enhancing the xanthophyll content of poultry feeds, comprising preparing a xanthophyll concentrate from orange oil by distilling the xanthophyll-containing orange oil under reduced pressure to obtain a distillation residue containing the xanthophyll in concentrated form, said residue concentrate containing at least 500 units of xanthophyll per gram, and thereafter mixing said orange oil xanthophyll concentrate with a poultry feed material containing less than 8,000 xanthophyll units per pound of feed material, said xanthophyll concentrate and said feed material being mixed in such proportions that the mixture contains in excess of 10,000 units of xanthophyll per pound.

2. The method of enhancing the xanthophyll content of poultry feeds, comprising distilling xanthophyll-containing orange oil under reduced pressure to remove most of the orange oil while leaving the xanthophyll in the distillation residue in concentrated form, said residue concentrate containing at least 500 units of xanthophyll per gram, and thereafter mixing said orange oil xanthophyll concentrate with a poultry feed material containing less than 8,000 xanthophyll units per pound of feed material, said xanthophyll concentrate being added to said feed material in amounts sufficient to provide at least 10,000 units of xanthophyll per pound of feed material.

3. The method of enhancing the xanthophyll content of poultry feeds, comprising distilling xanthophyll-containing orange oil under reduced pressure to remove most of the orange oil while leaving the xanthophyll in the distillation residue in concentrated form, said residue concentrate containing at least 500 units of xanthophyll per gram, and thereafter mixing said orange oil xanthophyll concentrate with a poultry feed ration containing less than 8,000 xanthophyll units per pound of feed material, said xanthophyll concentrate providing in excess of 2,000 units of xanthophyll per pound of said mixture, and said xanthophyll concentrate and said feed material being mixed in such proportions that the combined mixture contains in excess of 10,000 units of xanthophyll per pound.

4. The method of enhancing the xanthophyll content of poultry feeds, comprising preparing a xanthophyll concentrate from orange oil by extracting the xanthophyll-containing orange oil with anhydrous methanol and recovering a concentrated xanthophyll product from the methanol, said concentrate containing at least 500 units of xanthophyll per gram, and thereafter mixing said orange oil xanthophyll concentrate with the poultry feed material containing less than 8,000 xanthophyll units per pound of feed material, said xanthophyll concentrate and said feed material being mixed in such proportions that the mixture contains in excess of 10,000 units of xanthophyll per pound.

References Cited in the file of this patent

Burdick: Economic Botany, 10 (1956), pages 267–279.
Chem. Abst., 44 (1950), 3572d.